(12) United States Patent
Schultz et al.

(10) Patent No.: US 7,036,877 B2
(45) Date of Patent: May 2, 2006

(54) MODULAR MOUNTING ASSEMBLY

(75) Inventors: Eric E. Schultz, Angola, IN (US); Brett E. Drake, Coldwater, MI (US)

(73) Assignee: Grupo Antolin N.A., Auburn Hills, MI (US)

(*) Notice: Subject to any disclaimer, the term of this patent is extended or adjusted under 35 U.S.C. 154(b) by 0 days.

(21) Appl. No.: 11/229,737

(22) Filed: Sep. 19, 2005

(65) Prior Publication Data

US 2006/0012222 A1 Jan. 19, 2006

Related U.S. Application Data

(62) Division of application No. 11/080,910, filed on Mar. 14, 2005, now Pat. No. 6,946,588, which is a division of application No. 10/658,002, filed on Sep. 9, 2003, now Pat. No. 6,896,311.

(51) Int. Cl.
*B60J 7/00* (2006.01)

(52) U.S. Cl. .................. 296/214; 296/97.9

(58) Field of Classification Search .......... 296/214, 296/97.9
See application file for complete search history.

(56) References Cited

U.S. PATENT DOCUMENTS

| | | | |
|---|---|---|---|
| 4,989,911 A | 2/1991 | Van Order | |
| 5,056,853 A * | 10/1991 | Van Order | 296/97.9 |
| 5,201,564 A * | 4/1993 | Price | 296/97.9 |
| 5,242,204 A * | 9/1993 | Kitterman et al. | 296/97.9 |
| 5,269,060 A * | 12/1993 | Dowd et al. | 296/214 |
| 5,499,854 A * | 3/1996 | Crotty et al. | 296/97.13 |
| 5,752,853 A * | 5/1998 | Curtindale | 296/97.9 |
| 5,967,589 A * | 10/1999 | Spadafora | 296/97.9 |
| 5,975,617 A * | 11/1999 | Jacquemin et al. | 296/97.9 |
| 6,003,928 A | 12/1999 | Curtindale | |
| 6,007,136 A * | 12/1999 | Zittwitz et al. | 296/97.9 |
| 6,021,986 A * | 2/2000 | Murdock | 296/214 |
| 6,068,323 A * | 5/2000 | Brown et al. | 296/97.9 |
| 6,231,109 B1 * | 5/2001 | Beaver | 296/214 |
| 6,234,558 B1 * | 5/2001 | Curtindale | 296/214 |
| 6,250,708 B1 * | 6/2001 | Kurachi | 296/97.9 |
| 6,383,001 B1 * | 5/2002 | Sawayanagi | 439/248 |
| 6,428,078 B1 * | 8/2002 | Beaver | 296/97.9 |
| 6,511,116 B1 * | 1/2003 | De Jongh et al. | 296/97.9 |
| 6,568,749 B1 * | 5/2003 | Sawayanagi et al. | 296/214 |
| 6,595,571 B1 * | 7/2003 | Krebs et al. | 296/97.9 |
| 6,719,352 B1 * | 4/2004 | Arendsen et al. | 296/97.9 |
| 6,773,051 B1 * | 8/2004 | Davey et al. | 296/97.7 |

FOREIGN PATENT DOCUMENTS

| | | |
|---|---|---|
| EP | 0348 277 | 12/1989 |
| WO | WO02/081242 | 10/2002 |

* cited by examiner

OTHER PUBLICATIONS

PCT International Search Report #PCT/US2004/28669 dated Jan. 11, 2005.

*Primary Examiner*—Kiran B. Patel
(74) *Attorney, Agent, or Firm*—Young & Basile, P.C.

(57) ABSTRACT

A mounting assembly is disclosed for mounting a sun visor to a vehicle panel having opposing faces and an aperture therethrough. The mounting assembly includes a mounting component mountable to the vehicle panel. The mounting component includes a first side having a number of spaced apart retaining members extending therefrom and a second side including at least one catch projecting therefrom. The opposing faces of the panel are gripped between the second surface and the catch to retain said mounting component against the vehicle panel. The mounting assembly also includes a bezel component moveably connected to the mounting component by the retaining members.

9 Claims, 8 Drawing Sheets

MODULAR MOUNTING ASSEMBLY

CROSS REFERENCE TO CO-PENDING APPLICATIONS

This application is a divisional of U.S. patent application Ser. No. 11/080,910 filed Mar. 14, 2005 and issuing as U.S. Pat. No. 6,946,588 on Sep. 20, 2005, which is a divisional of U.S. patent application Ser. No. 10/658,002, filed Sep. 9, 2003, now U.S. Pat. No. 6,896,311, issued May 24, 2005, the contents of both of which are incorporated herein in their entirety

BACKGROUND OF THE INVENTION

1. Field of the Invention

The present invention relates generally to interior components for vehicles and, more particularly, to a mounting assembly suitable for mounting a sun visor in a vehicle interior.

2. Description of the Related Art

Sun visors are typically mounted in a vehicle in a manner that allows a visor blade to pivot between a "stored" position adjacent an interior headliner and a "use" position adjacent a vehicle windshield. Since the sun may enter a side window of a vehicle, most sun visors are allowed to pivot between the windshield and the side window in the "use" position.

A number of methods have been proposed for moveably mounting a sun visor to a vehicle interior. One known method is a snap-in type mount. This type of mount is generally the easiest and most cost effective to install, since a mounting member simply snaps into a hole in an interior panel of a vehicle. A pivot rod supported visor blade is then moveably attached to the mounting member to complete the installation of the sun visor.

It has become increasingly more popular for vehicle manufacturers, particularly in the automotive industry, to require vehicle component suppliers to supply integrated vehicle systems. One such integrated system is a vehicle headliner assembly that includes, among other components, a vehicle headliner, a driver sun visor and a passenger sun visor. Conventional sun visor mounts are typically configured for use with a single headliner configuration. However, the ability to use a single mount with multiple headliner configurations would allow a supplier to streamline their product portfolio and reduce the various costs associated with providing multiple mount configurations. Accordingly, a need exists for a modular mount suitable for use with different headliner configurations.

SUMMARY OF THE INVENTION

In accordance with an embodiment of the invention, a mounting assembly is disclosed for mounting a sun visor to a vehicle panel having opposing faces and an aperture therethrough. The mounting assembly includes a mounting component mountable to the vehicle panel. The mounting component includes a first side having a number of spaced apart retaining members extending therefrom and a second side including at least one catch projecting therefrom. The opposing faces of the panel are gripped between the second surface and the catch to retain the mounting component against the vehicle panel. The mounting assembly also includes a bezel component moveably connected to the mounting component by the retaining members.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION

Figure 1:
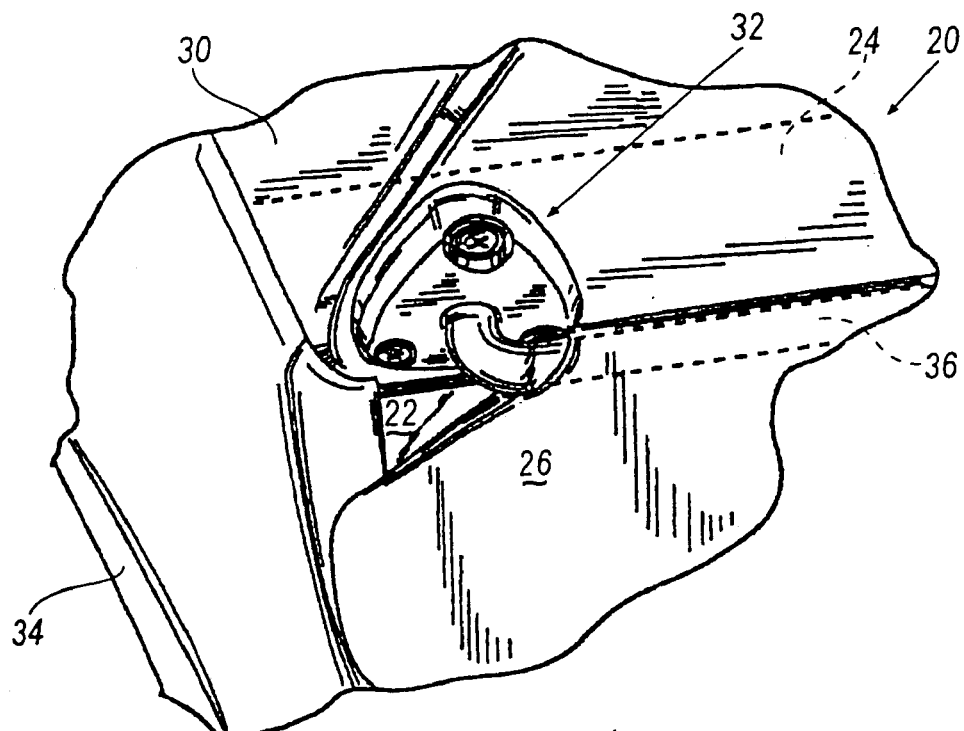
FIG. 1 is a fragmentary perspective view of a sun visor assembly installed in a vehicle.

Referring now to the drawings, the preferred illustrative embodiments of the present invention are shown in detail. Although the drawings represent some preferred embodiments of the present invention, the drawings are not necessarily to scale and certain features may be exaggerated to better illustrate and explain the present invention. Further, the embodiments set forth herein are not intended to be exhaustive or otherwise limit or restrict the invention to the precise forms and configurations shown in the drawings and disclosed in the following detailed description.

Referring to FIG. 1, a vehicle 20 is shown that includes a windshield 22 and a hidden sheet metal panel 24 that functions as a backing plate of limited size for attaching a sun visor 26 or as a larger sheet metal panel that defines the interior roof of vehicle 20. Panel 24 is covered by a headliner 30, such AS a cushioned fabric material, which may be colored to complement the decor of the vehicle interior. A layer of energy-absorbing material (not shown), such as foam and the like, may be disposed between panel 24 and headliner 30 to absorb the energy of an impact by the vehicle occupants during an accident.

A sun visor mounting assembly 32 secures sun visor 26 to panel 24 and/or headliner 30 and permits sun visor 26 to be pivoted about a substantially vertical axis from a position proximate windshield 22 to a position proximate a side window 34 of vehicle 20. Sun visor 26 is rotatably supported on a visor shaft 36 extending from mounting assembly 32 and may be secured to a support hook (not illustrated) when not in use. It will be appreciated that the design of sun visor 26 is not material to the present invention and that other sun visor designs, including those that employ electrical circuitry to illuminate a lamp on the visor, may be used.

Figure 2:
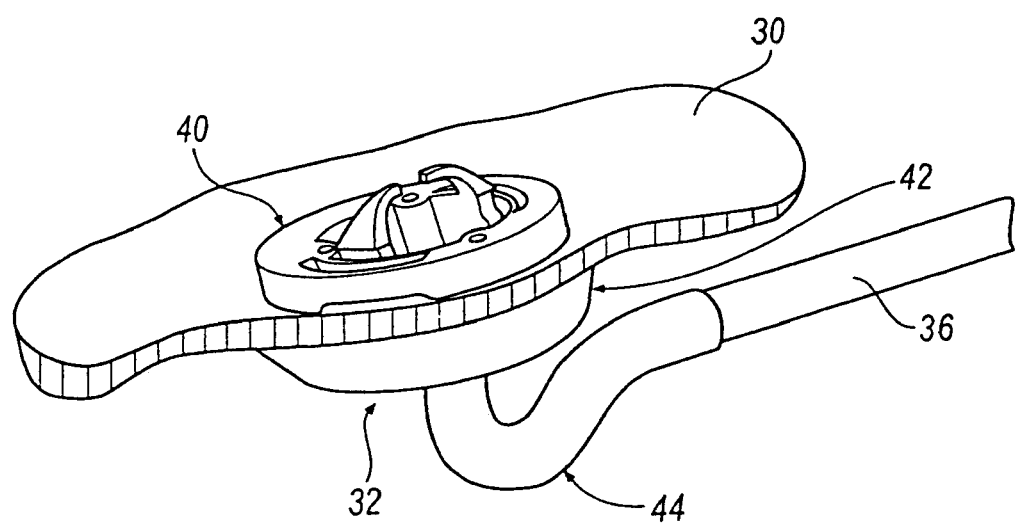
FIG. 2 is a perspective view of a mounting assembly according to an embodiment of the invention, pre-installed in a vehicle headliner.
Figure 3:
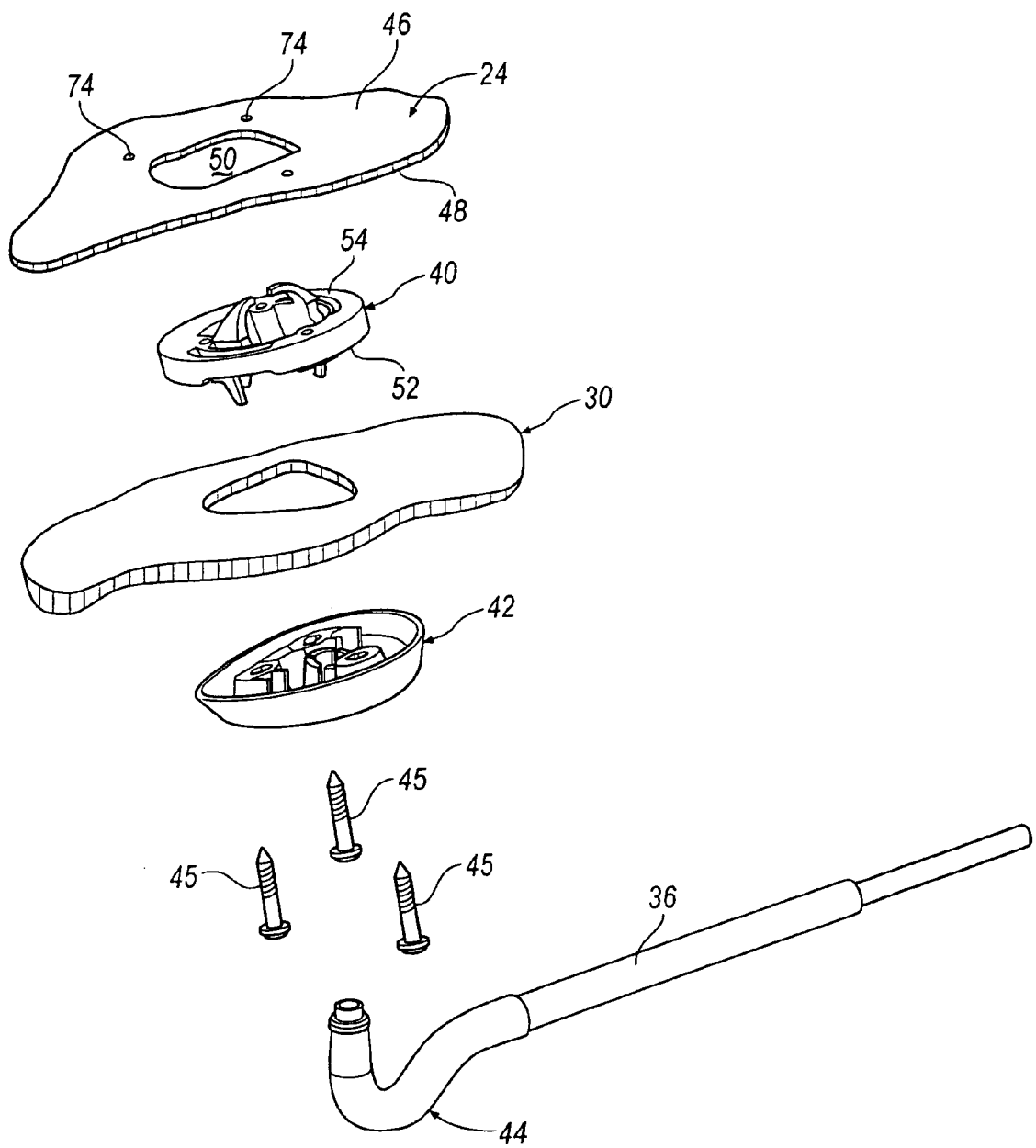
FIG. 3 is an exploded view of the mounting assembly and headliner of FIG. 2.

Referring to FIGS. 2 and 3, an embodiment of mounting assembly 32 is shown that includes a mounting component 40 and a bezel component 42. An elbow 44 is connectable with sun visor 26 via visor shaft 36. A plurality of fasteners 45, such as screws and the like, pass through bezel component 42 and mounting component 40 to secure components 40, 42 to panel 24. Panel 24 generally includes an inner surface 46, an outer surface 48 and an aperture 50 through which a portion of mounting component 40 is inserted to retain mounting assembly 32 against panel 24 until fasteners 45 may be installed. Mounting component 40 and bezel component 42 cooperatively engage headliner 30 to support elbow 44 and sun visor 26 during transport of headliner 30. Mounting component 42 also temporarily secures headliner 30, bezel component 42 and sun visor 26 to panel 24 during installation into vehicle 20 until fasteners 45 can be secured to panel 24.

Figure 4:
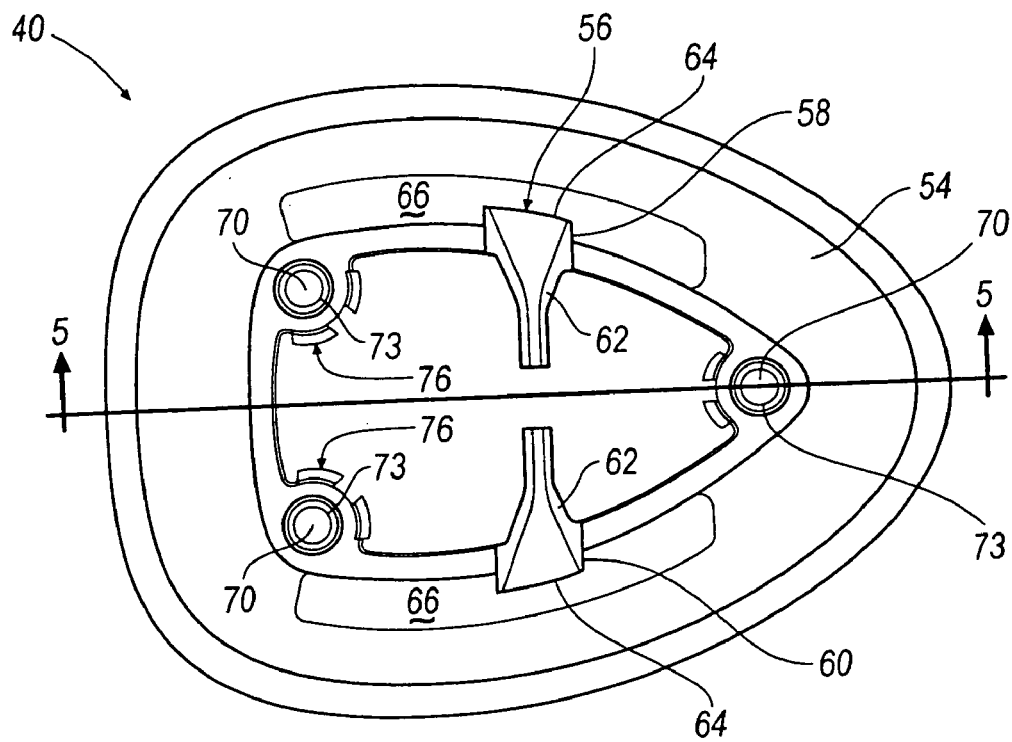
FIG. 4 is a top view of a mounting component according to an embodiment of the invention.
Figure 5:
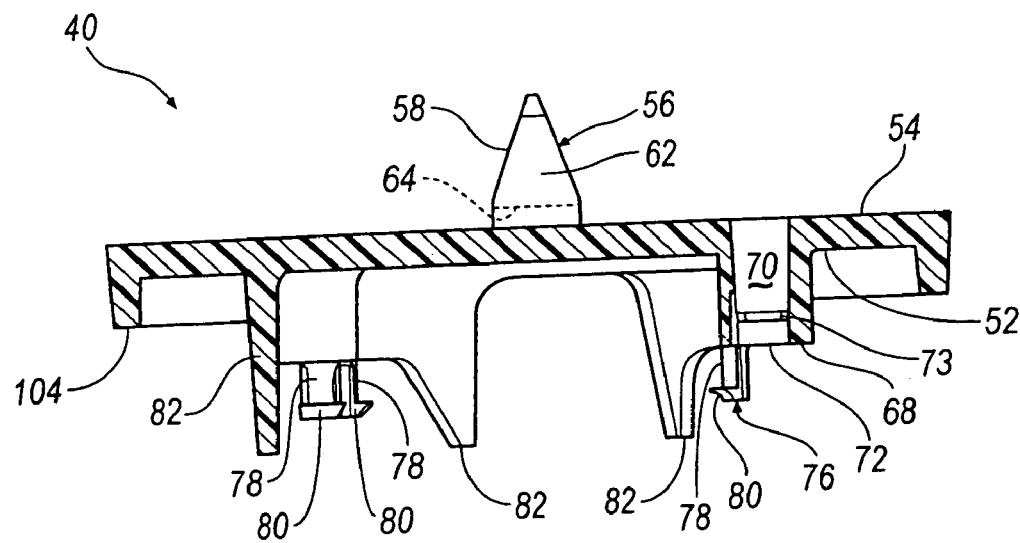
FIG. 5 is a cross-sectional view of the mounting component of FIG. 4 taken along line 5—5.
Figure 6:
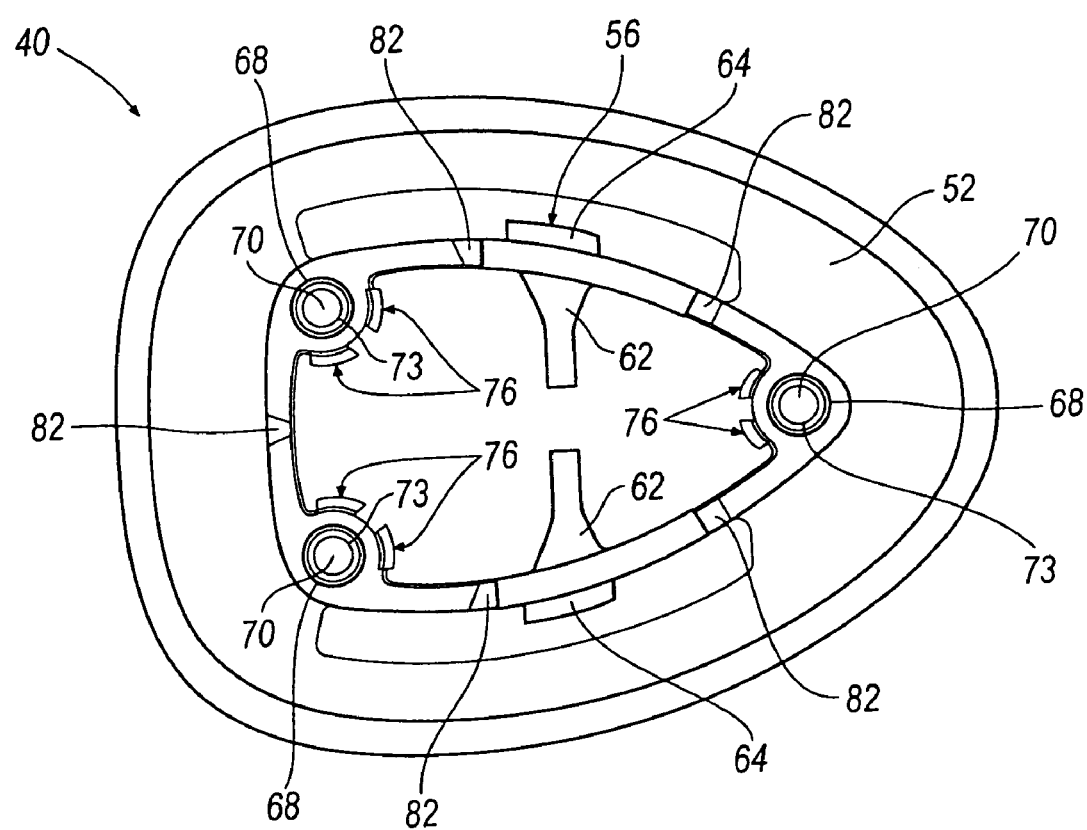
FIG. 6 is a bottom view of the mounting component of FIG. 4 according to an embodiment of the invention.

Referring to FIGS. 4–6, mounting component 40 may be molded as a one-piece structure from a polymeric material, such as ABS and other suitable plastics. In an embodiment, mounting component 40 includes a first side 52 configured to engage bezel component 42 and a second side 54 configured to engage panel 24. In a particular configuration, second side 54 includes a catch 56 that extends outwardly therefrom. In the illustrated configuration, catch 56 includes a pair of resilient catch members 58 and 60, each including a tapered arm portion 62 and a ledge 64 having a surface that is generally parallel to and slightly spaced apart from second surface 54. Tapered arm portions 62 engage panel 24 during installation, deflect inwardly as catch 56 is inserted into hole 50 in panel 24 and snap-back once fully inserted therein to grasp panel 24 between ledge 64 and second surface 54. An aperture 66 may extend through mounting component 40 adjacent each of catch members 58, 60 to provide an opening though which to view the location of ledge 64 relative to panel 24.

With particular reference to FIGS. 5 and 6, first side 52 includes a number of spaced apart towers 68 that extend therefrom. Towers 68 each include a duct 70 that extends from a distal end 72 through second side 54. Each duct 70 may include at least one inwardly extending catch feature 73 that engages fastener 45 as it is inserted therein. In the illustrated embodiment, catch feature 73 is a radially inwardly directed protrusion that engages one or more threads on fastener 45. Catch features 73 temporarily retain fasteners 45 in ducts 56 so that mounting assembly 32 and fasteners 45 can be shipped as a single unit. Upon assembly into a vehicle, each fastener 45 is received in an aperture 74 (shown in FIG. 3) in panel 24 to secure mounting component 40 and bezel component 42 to panel 24. While fasteners 45 are shown in the illustrated embodiment as being screws, it is recognized that other suitable fasteners or fastening methods, such as rivets and the like, may also be employed to secure components 40, 42 to panel 24.

Referring still to FIGS. 5 and 6, mounting component 42 also includes a number of spaced apart retaining members 76 extending therefrom. In an embodiment, each retaining member 76 includes at least one leg 78 that extends downwardly from distal end 72 of towers 68. When retaining member 76 includes more than one leg 78, each leg 78 may be spaced apart from the other, as shown in FIG. 6. Legs 78 are resiliently deflectable relative to tower 68 and include a foot 80. As will be described in detail below, feet 80 are configured to engage bezel component 42 to attach bezel component 42 to mounting component 40.

As illustrated in FIG. 5, mounting component 40 may also include at least one separator member 82 that extends from first side 52. In an embodiment, mounting component 40 includes a number of separator members 82, one or more of which are positioned between towers 68. Separator members 82 are longer than towers 68 by a predetermined length and selectively engage bezel component 42, as will be described below.

Figure 7:
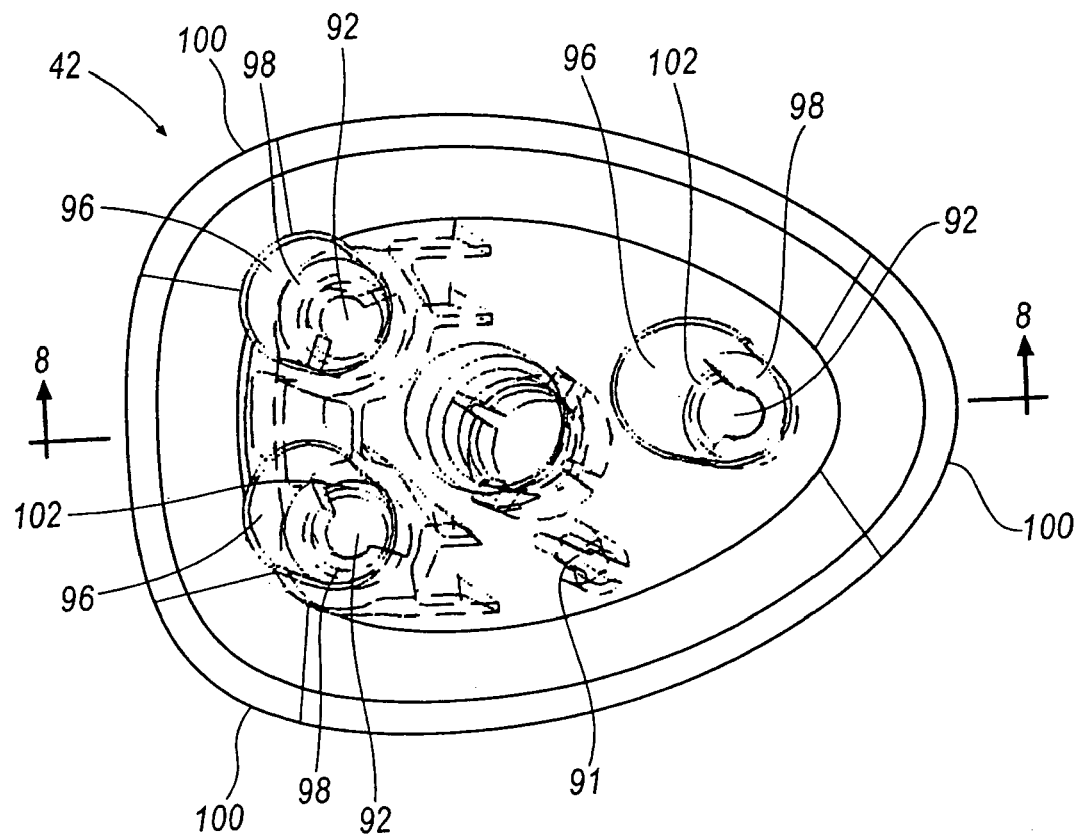
FIG. 7 is an exterior view of a bezel component according to an embodiment of the invention.
Figure 8:
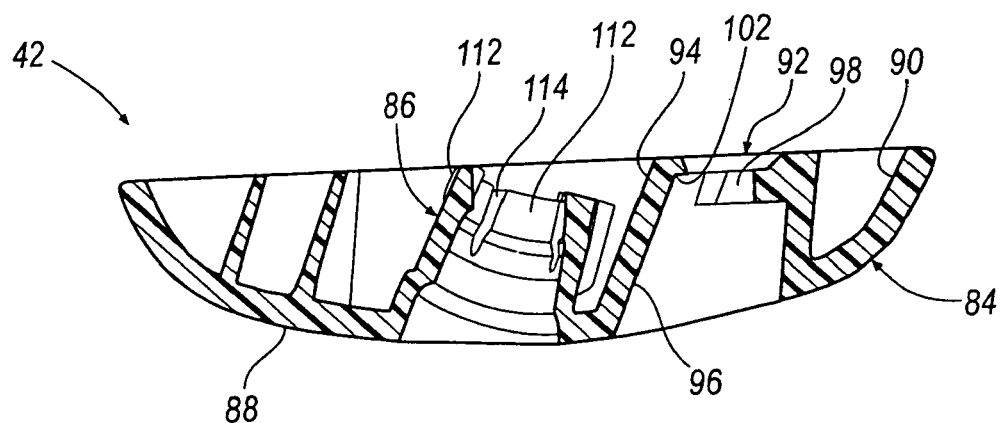
FIG. 8 is a cross sectional view of the bezel component of FIG. 7 taken along line 8—8.
Figure 9:
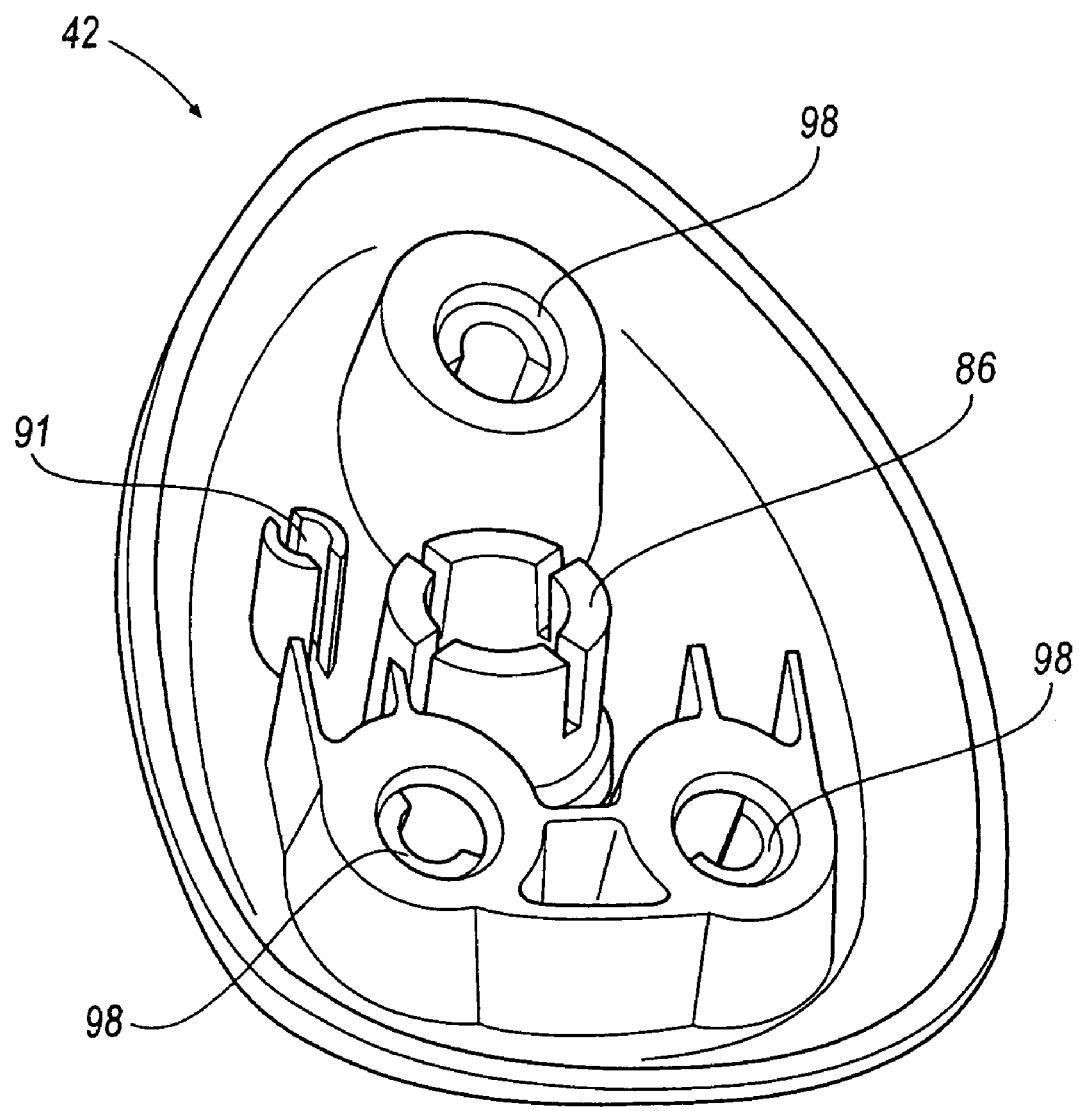
FIG. 9 is an interior view of the bezel component of FIG. 7 according to an embodiment of the invention.

Referring to FIGS. 7–9, bezel component 42 may also be molded as a one-piece structure from a polymeric material, such as ABS or other suitable plastic. In an embodiment, bezel component 42 includes a main body portion 84 and an integrally formed bearing portion 86. The shape of body portion 84 preferably corresponds to the polygonal shape of mounting component 40. An exposed outer surface 88 of bezel component 42 is aesthetically attractive and may be provided with a patterned texture. An interior surface 90 of bezel component 42 is hidden from view once installed in vehicle 20. At least one opening 91 may be provided through bezel component to allow passage of electrical wires for powering a sun visor vanity mirror light (not shown).

In an embodiment, body portion 84 includes a number of apertures 92 that correspond in number to ducts 70 in mounting component 40. In a particular configuration, each aperture 92 is defined by a tower 94 that extends upwardly from interior surface 90. Each tower 94 creates a recess 96 that extends away from exposed outer surface 88. Apertures 92 are partially enclosed by a generally semi-circular flat 98, which may be oriented such that an open portion of each aperture 92 is positioned inward of flat 98 in a direction extending from a corner 100 of bezel component 42. The remaining circumference of aperture 92 is not covered by flat 98, but includes a ledge 102. The edge of aperture 92 is slightly tapered to deflect legs 78 and feet 80 as bezel component 42 is attached to mounting component 40. As feet 80 cam over the taper to aperture 92, legs 78 snap back allowing feet 80 to lock behind ledge 102 to attach bezel component 42 to mounting component 40 until fasteners 45 can be applied (see, e.g., FIGS. 10 and 11).

Figure 10:
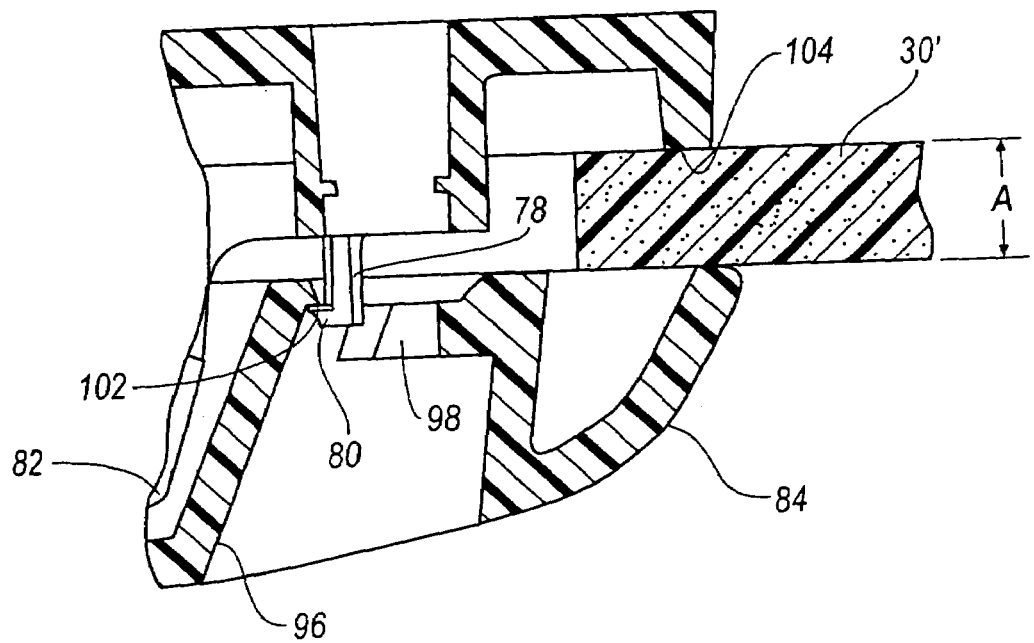
FIG. 10 is a detailed cross-sectional view showing a bezel component secured to a mounting component and sandwiching a headliner of first thickness "A" therebetween.
Figure 11:
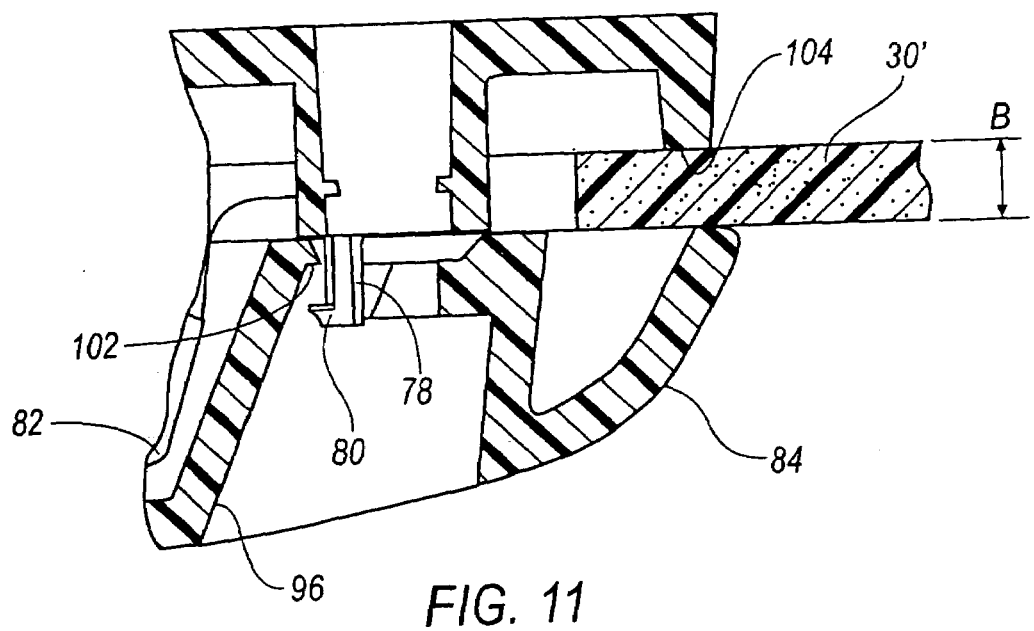
FIG. 11 is a detailed cross-sectional view showing a bezel component secured to a mounting component, and sandwiching a headliner of second thickness "B" therebetween.

Referring now to FIGS. 10 and 11, attachment of bezel component 42 to mounting component 40 allows headliner 30 to be sandwiched therebetween, enabling mounting assembly 32 to be transported with headliner 30. Particularly, body portion 84 of bezel component 42 engages one side of headliner 30 and a raised peripheral edge 104 of mounting component 40 engages the other side of headliner 30. Unlike prior art mounting assemblies, bezel component 42 is movable relative to mounting component 40 once attached thereto. Among other things, movement of bezel component 42 relative to mounting component 40 allows mounting assembly 32 to accommodate various headliner thicknesses. For example, FIG. 10 illustrates mounting assembly 32 secured to a first headliner 30' having a thickness "A". In FIG. 11, mounting assembly 32 is secured to a second headliner 30" having a thickness "B" that is less than thickness "A" in FIG. 10.

Figure 12:
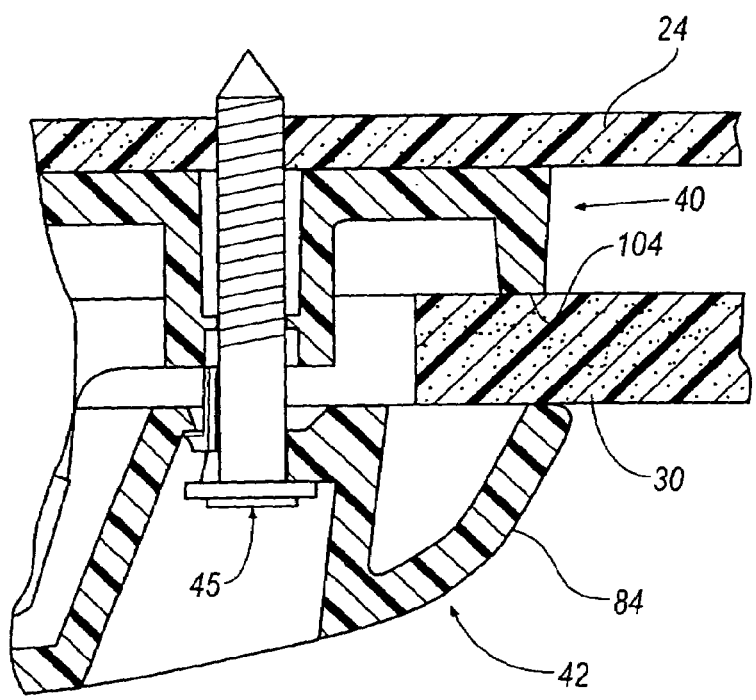
FIG. 12 is the detailed cross-sectional view of FIG. 10 showing a fastener securing the mounting assembly to a vehicle panel.

Once the headliner assembly (i.e., headliner 30, mounting assembly 32, etc) is secured in a vehicle interior and fasteners 45 are attached to panel 24, as in FIG. 12, body portion 84 of bezel component 42 is movably drawn by fasteners 45 against headliner 30, which in turn is drawn against the raised peripheral edge 104 of mounting component 32 to tightly sandwich headliner 30 therebetween. As will be appreciated, various headliner thicknesses can be accommodated with this design by permitting movement of bezel component 42 relative to mounting component 40. The amount of movement between bezel component 42 and mounting component 40 is limited by separator members 82 so that fasteners cannot overdraw bezel component 42, thereby crushing or otherwise deforming headliner 30.

Figure 13:
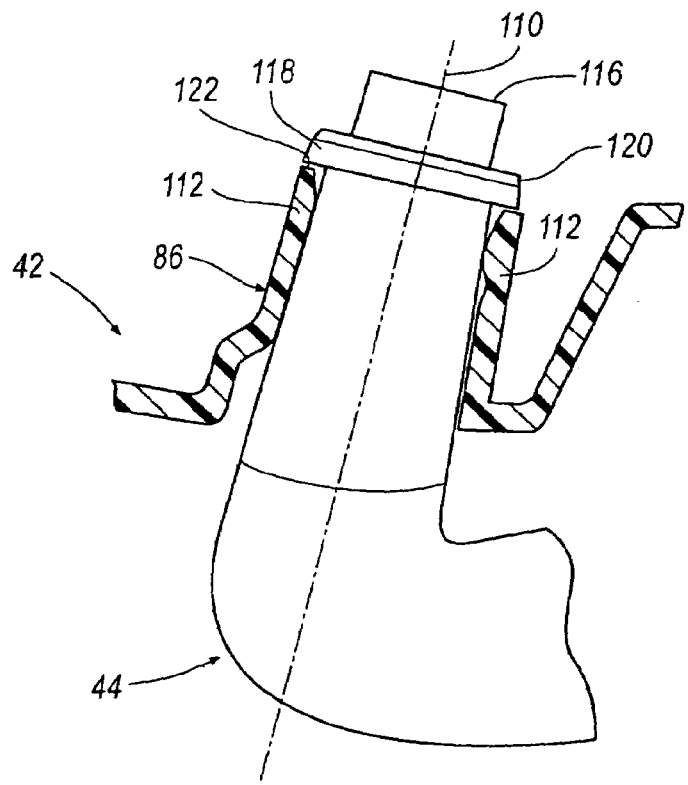
FIG. 13 is a partial cross-sectional view of a bezel component according to an embodiment of the invention, showing an elbow secured to a bearing portion of the bezel component.

Referring to FIGS. 8 and 13, an embodiment of elbow 44 and bearing portion 86 are shown in detail. Elbow 44 is configured to be received in bearing portion 86 about a pivot axis 110. In an embodiment, elbow 44 is retained in bearing portion 86 by two or more resilient legs 112 that are at least partially separated by a slot 114 (FIG. 8). In the illustrated embodiment, a distal end 116 of elbow 44 includes a flange 118 having a conical surface 120, which forces expansion of legs 112 during insertion of elbow 44 into bearing portion 86. As flange 118 moves above a distal end 122 of legs 112, legs 112 contract and engage an underside of flange 118 to rotatably retain elbow 44 in bezel component 42.

The structure of mounting assembly 32 will be further understood in view of the following description of an embodiment of a method of installation. Mounting assembly 32 is first attached to headliner 30 as described above. Elbow 44 is secured to bezel component 42 prior to or subsequent to attachment of bezel component 42 with mounting component 40. With headliner 30 sandwiched between bezel component 42 and mounting component 40, fasteners 45 may then be inserted through apertures 92 in bezel component 42 into ducts 70 in mounting component 40. Fasteners 45 are temporarily engaged and retained within ducts 70 by catch feature 73. During installation of the headliner assembly into a vehicle interior, catch 56 on mounting component 40 is inserted into aperture 50 of panel 24 to retain mounting assembly 32 against panel 24, as described above. Finally, fasteners 45 are attached to panel 24 to secure mounting assembly 32 to panel 24 (see FIG. 12).

While the present invention has been described with reference to the illustrated embodiments, it is recognized that various modifications to the embodiments of the present invention will be apparent to those skilled in the art without departing from the scope of the claimed invention. For example, those modifications include, but are not limited to, modifying the shape of bezel component 42 and mounting component 40, modifying the degree of movement permitted between bezel component 42 and mounting component 40, and modifying the shape, number and orientation of retaining members 76. Moreover, the inventive mounting component 40 may also be utilized to secure other components in a vehicle, for example, to attach door panels to a vehicle door.

Although certain preferred embodiments of the present invention have been described, the invention is not limited to the illustrations described and shown herein, which are deemed to be merely illustrative of the best modes of carrying out the invention. A person of ordinary skill in the art will realize that certain modifications and variations will come within the teachings of this invention and that such variations and modifications are within its spirit and the scope as defined by the claims.

What is claimed is:

1. A vehicle headliner assembly comprising:
   a mounting component mountable to a vehicle panel and including a first side having a number of spaced apart retaining members extending therefrom and a second side including at least one catch projecting therefrom, wherein the opposing faces of the panel are gripped between the second surface and the catch to retain said mounting component against the vehicle panel;
   a bezel component moveably connected to the mounting component by the retaining members; and
   a headliner sandwiched between the mounting component and the bezel component.

2. The vehicle headliner assembly of claim 1, further including a sun visor moveably attachable to the vehicle panel by the mounting component and bezel component.

3. The vehicle headliner assembly of claim 1, further including at least one fastener that extends through the mounting and bezel components and adapted to engage the vehicle panel to secure the mounting component and bezel component to the vehicle panel.

4. The vehicle headliner assembly of claim 3, wherein the bezel component is permitted to move relative to the mounting component prior to engagement of the fastener with the vehicle panel.

5. The vehicle headliner assembly of claim 3, wherein the mounting component includes at least one duct through which the fastener extends.

6. The vehicle headliner assembly of claim 5, wherein the duct includes at least one inwardly extending catch feature that engages and retains the fastener within the duct.

7. The vehicle headliner assembly of claim 5, wherein the bezel component includes at least one aperture that coaxially aligns with the duct in the mounting component.

8. The vehicle headliner assembly of claim 7, wherein the retaining members engage a ledge surrounding at least a portion of the apertures to moveably secure the bezel component to the mounting component.

9. The vehicle headliner assembly of claim 1, wherein the catch includes a lead-in ramp for guiding the catch into the aperture in the vehicle panel.

* * * * *